(12) United States Patent
Hasegawa et al.

(10) Patent No.: US 10,651,456 B2
(45) Date of Patent: May 12, 2020

(54) ALL-SOLID-STATE BATTERY AND METHOD FOR PRODUCING ALL-SOLID-STATE BATTERY

(71) Applicant: TOYOTA JIDOSHA KABUSHIKI KAISHA, Toyota-shi, Aichi-ken (JP)

(72) Inventors: Hajime Hasegawa, Susono (JP); Yuki Matsushita, Atsugi (JP); Mitsuru Tateishi, Susono (JP); Hideaki Nishimura, Shizuoka-ken (JP); Hideyo Ebisuzaki, Toyota (JP); Yusuke Okuhata, Susono (JP); Norihiro Ose, Shizuoka-ken (JP); Shigenori Hama, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 72 days.

(21) Appl. No.: 15/935,687

(22) Filed: Mar. 26, 2018

(65) Prior Publication Data

US 2018/0294469 A1    Oct. 11, 2018

(30) Foreign Application Priority Data

Apr. 7, 2017    (JP) .................................. 2017-077029

(51) Int. Cl.
*H01M 2/34*    (2006.01)
*H01M 10/0585*    (2010.01)
(Continued)

(52) U.S. Cl.
CPC .......... *H01M 2/34* (2013.01); *H01M 10/0413* (2013.01); *H01M 10/0468* (2013.01);
(Continued)

(58) Field of Classification Search
None
See application file for complete search history.

(56) References Cited

U.S. PATENT DOCUMENTS

| 2010/0279170 | A1* | 11/2010 | Lee | ........................ | H01M 2/263 |
| | | | | | 429/178 |
| 2011/0136003 | A1* | 6/2011 | Kim | ..................... | H01M 2/0473 |
| | | | | | 429/179 |

(Continued)

FOREIGN PATENT DOCUMENTS

| JP | 2001-068156 A | 3/2001 |
| JP | 2001-068157 A | 3/2001 |

(Continued)

OTHER PUBLICATIONS

JP-2014203618-A English machine translation (Year: 2014).*

*Primary Examiner* — Scott J. Chmielecki
(74) *Attorney, Agent, or Firm* — Sughrue Mion, PLLC

(57) ABSTRACT

In an all-solid-state battery including at least one short-circuit current shunt part and at least one electric element which are stacked, when the battery is constrained, cracking etc. of the adhesive in the short-circuit current shunt pail is prevented.

The all-solid-state battery includes at least one short-circuit current shunt part and at least one electric element which are stacked, to the all-solid-state battery constraint pressure being applied by a constraining member in a direction of stacking the short-circuit current shunt part and the electric element, wherein the short-circuit current shunt part includes a first current collector layer, a second current collector layer, and an insulating layer provided between the first and second current collector layers, all of these layers being stacked along the direction, to be adhered to each other with adhesive, the electric element includes a cathode current collector layer, a cathode material layer, a solid electrolyte layer, an anode material layer, and an anode current collector layer, all of these layers being stacked along the direction, the first current collector layer is electrically connected with the cathode current collector layer, (Continued)

the second current collector layer is electrically connected with the anode current collector layer, and the adhesive is provided for a zone in the short-circuit current shunt part, to the zone the constraint pressure from the constraining member not being applied.

16 Claims, 10 Drawing Sheets

(51) Int. Cl.
  *H01M 10/04* (2006.01)
  *H01M 10/0562* (2010.01)
  *H01M 10/0525* (2010.01)
(52) U.S. Cl.
  CPC ... *H01M 10/0562* (2013.01); *H01M 10/0585* (2013.01); *H01M 10/0525* (2013.01); *H01M 2200/00* (2013.01); *H01M 2220/20* (2013.01)

(56) References Cited

U.S. PATENT DOCUMENTS

| | | | | |
|---|---|---|---|---|
| 2012/0308879 | A1* | 12/2012 | Kim | H01M 2/0207 |
| | | | | 429/186 |
| 2015/0364743 | A1* | 12/2015 | Shen | H01M 10/0413 |
| | | | | 429/61 |
| 2016/0351952 | A1* | 12/2016 | Ohtomo | H01M 10/0562 |
| 2017/0214028 | A1* | 7/2017 | Oh | H01M 2/266 |

FOREIGN PATENT DOCUMENTS

| | | | |
|---|---|---|---|
| JP | 2001068156 A | * | 3/2001 |
| JP | 2014203618 A | * | 10/2014 |
| JP | 2015-018710 A | | 1/2015 |
| JP | 2015049989 A | * | 3/2015 |
| JP | 2016-149238 A | | 8/2016 |
| WO | 2015/098551 A1 | | 7/2015 |

* cited by examiner

Fig. 6A
Fig. 6B
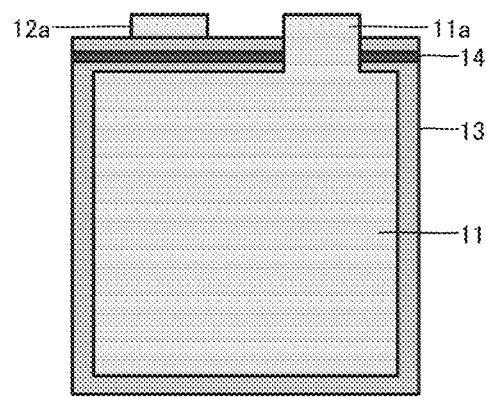
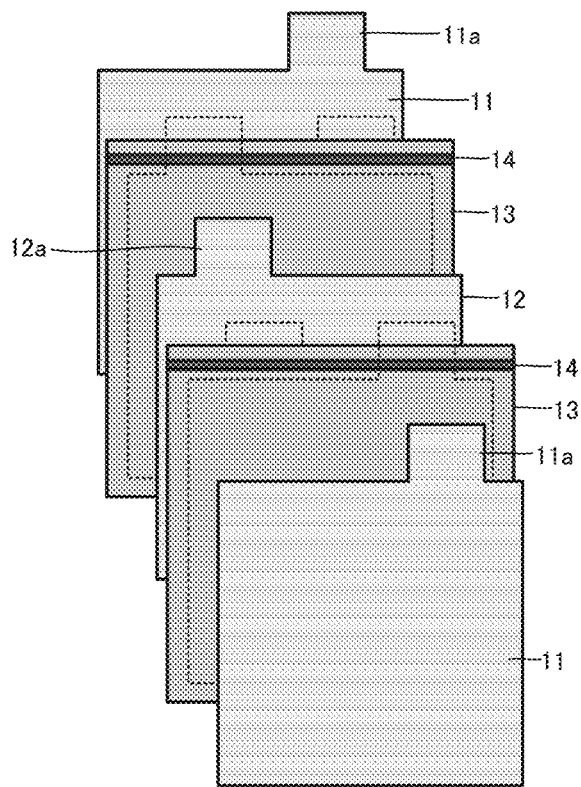

ALL-SOLID-STATE BATTERY AND METHOD FOR PRODUCING ALL-SOLID-STATE BATTERY

FIELD

The present application relates to stacked all-solid state batteries, and methods for producing the same.

BACKGROUND

Patent Literature 1 discloses a stacked polymer electrolyte battery that includes a short-circuiting and heat radiation accelerating unit formed by arranging two metal plates with an insulator therebetween outside a stacked electrode group (a plurality of electric elements). It is believed that thereby when electrodes short-circuit in nail penetration testing on the battery or the like, passing a short-circuit current through the short-circuiting and heat radiation accelerating unit can reduce voltage of the electric elements, and makes it possible to smoothly radiate heat generated in the unit etc., to the outside. Patent Literatures 2 and 3 also disclose various techniques for suppressing heat generation caused by short circuits inside a battery.

On the other hand, as disclosed in Patent Literature 4, restraining pressure may be applied to a laminated body of a cathode, an anode, and a solid electrolyte layer in an all-solid-state battery. Whereby the contact of an active material particle with a solid electrolyte etc. are maintained, to improve the battery performance. Patent Literature 5 also discloses the same structure, wherein an extremely high constraint pressure of 8N in screwing pressure is applied to an all-solid-state battery.

CITATION LIST

Patent Literature

Patent Literature 1: JP 2001-068156 A
Patent Literature 2: JP 2001-068157 A
Patent literature 3: JP 2015-018710 A
Patent Literature 4: WO2015/098551 A1
Patent Literature 5: JP 2016-149238 A

SUMMARY

Technical Problem

It is expected that in an all-solid-state-battery, a stack for shunting a current from an electric element (a part that causes a short-circuit current to divide, to flow thereinto when the electric element and the short-circuit current shunt part short-circuit, hereinafter referred to as "short-circuit current shunt part") is provided separately from the electric element, which makes it possible to suppress heat generation inside the electric element in nail penetration testing. For example, such a problem arises in an all-solid-state battery formed by electrically connecting a plurality of stacked electric elements in parallel that when nail penetration testing short-circuits the electric elements, electrons flow from some electric elements into the other electric elements (which may be referred to as "rounding current" hereinafter), which results in local rising in temperature of some electric elements, to deteriorate battery material. However, it is expected that a short-circuit current shunt part is provided separately from the electric elements, and not only some electric elements but also the short-circuit current shunt part is short-circuited in nail penetration testing, which makes it possible to shunt a rounding current from the other electric elements to not only some electric elements but also the short-circuit current shunt part of low shunt resistance, thereby local rising in temperature of just some electric elements can be prevented.

Here, the short-circuit current shunt part is configured by stacking a first current collector layer, an insulating layer, and a second current collector layer. In view of easy handleability when the battery is assembled, the first current collector layer is preferably adhered to the insulating layer with adhesive, and the insulating layer is preferably adhered to the second current collector layer with adhesive. However, according to new findings of the inventors of the present application, when an all-solid-state battery is configured using a short-circuit current shunt part that is subjected to adhesion with an adhesive, the following new problems arise.

When constraint pressure is applied to the all-solid-state battery, the constraint pressure is applied to not only electric elements but also the short-circuit current shunt part. In this case, the constraint pressure causes strain inside the short-circuit current shunt part (for example, the interfaces between current collector layers and an insulating layer). Here, when the current collector layers and the insulating layer of the short-circuit current shunt part are adhered to each other with adhesive, cracking etc. may occur to the adhesive due to strain caused by the constraint pressure, which might vary properties inside the short-circuit current shunt part.

When the current collector layers and the insulating layer of the short-circuit current shunt part are adhered to each other with adhesive, the current collector layers might deform along with the insulating layer in nail penetration testing as following a nail, which makes it impossible to stably touch the first current collector to the second current collector layer, which might make it impossible to function the short-circuit current shunt part.

Solution to Problem

The inventors of the present application had intensively researched for solving the above problems, and found the followings:

(1) it is better not to provide adhesive between the current collector layers and the insulating layer at a nail-penetrating portion in order for the current collector layers not to follow the nail along with the insulating layer in nail penetration testing;

(2) when constraint pressure is applied to the short-circuit current shunt part, the current collector layers and the insulating layer slide upon each other, which makes it possible to ease strain of the interfaces between the current collector layers and the insulating layer. That is, it is better not to provide adhesive between the current collector layers and the insulating layer over a portion of the short-circuit current shunt part where constraint pressure is applied;

(3) generally, the nail-penetrating portion originating in nail penetration testing is within a zone where constraint pressure is applied. That is, if adhesive is not provided for the portion of the short-circuit current shunt part where constraint pressure is applied, the adhesive is not provided for the nail-penetrating portion inevitably; and (4) in view of the above (1) to (3), it is better that adhesive is provided in a zone in the short-circuit current shunt part where constraint pressure of the battery is not applied.

Based on the above described findings, the present application discloses an all-solid-state battery comprising at least one short-circuit current shunt part and at least one electric element which are stacked, to the all-solid-state battery constraint pressure being applied by a constraining member in a direction of stacking the short-circuit current shunt part and the electric element, the short-circuit current shunt part comprises a first current collector layer, a second current collector layer, and an insulating layer provided between the first and second current collector layers, all of these layers being stacked along the direction, to be adhered to each other with adhesive, the electric element comprises a cathode current collector layer, a cathode material layer, a solid electrolyte layer, an anode material layer, and an anode current collector layer, all of these layers being stacked along the direction, the first current collector layer is electrically connected with the cathode current collector layer, the second current collector layer is electrically connected with the anode current collector layer, and the adhesive is provided for a zone in the short-circuit current shunt part, to the zone the constraint pressure from the constraining member not being applied as one means for solving the above problems.

Needless to say, "(to) the zone the constraint pressure from the constraining member not being applied" is "a zone other than a zone where the constraint pressure from the constraining member is applied". "A zone where the constraint pressure from the constraining member is applied" is a zone where all the first current collector layer, the insulating layer, the second current collector layer, the cathode current collector layer, the cathode material layer, the solid electrolyte layer, the anode material layer, and the anode current collector layer lie continuously in the direction of stacking the short-circuit current shunt part and the electric element, and which is within a range to which contact pressure from the constraining member is applied. That is, if this continuance is broken at any of the above layers in the direction of stacking the short-circuit current shunt part and the electric element, constraint pressure is blocked by a gap. This broken and blocked portion is "(to) the zone the constraint pressure from the constraining member not being applied". A zone where the above layers continuously lie in the direction of stacking the short-circuit current shunt part and the electric element, but which is within a range to which contact pressure from the constraining member is not applied is also "(to) the zone the constraint pressure from the constraining member not being applied".

In the all-solid-state battery of the present disclosure, preferably, the adhesive is provided outside the cathode material layer, the solid electrolyte layer, and the anode material layer in a view in the direction.

In the all-solid-state battery of the present disclosure, preferably, each of the first and second current collector layers includes a current collector tab, and the adhesive is provided for the current collector tab.

In the all-solid-state battery of the present disclosure, preferably, in the view in the direction, an area of the first current collector layer excluding the current collector tab is smaller than that of the insulating layer, an area of the second current collector layer excluding the current collector tab is smaller than that of the insulating layer, and the adhesive is provided for a zone in the insulating layer, the zone protruding to an outside of outer edges of the first and second current collector layers.

In the all-solid-state battery of the present disclosure, preferably, the adhesive has a linear shape.

In the all-solid-state battery of the present disclosure, preferably, the short-circuit current shunt part has five-layer structure of the first current collector layer, the insulating layer, the second current collector layer, the insulating layer, and the first current collector layer, all of the layers being stacked in this order.

In the all-solid-state battery of the present disclosure, preferably, said at least one short-circuit current shunt part and a plurality of the electric elements are stacked, and the electric elements are electrically connected in parallel.

The present application discloses a method for producing an all-solid-state battery, the method comprising: a first step of stacking a first current collector layer, an insulating layer, and a second current collector layer, and adhering them to each other with adhesive, to make at least one short-circuit current shunt part; a second step of stacking a cathode current collector layer, a cathode material layer, a solid electrolyte layer, an anode material layer, and an anode current collector layer, to make at least one electric element; a third step of stacking the short-circuit current shunt part and the electric element along a direction of stacking the layers; and a fourth step of constraining the short-circuit current shunt part and the electric element, which are stacked, by a constraining member, and at the same time applying constraint pressure along the direction, wherein a position where the adhesive is provided for the short-circuit current shunt part is determined in the first step so that the adhesive is arranged in a zone to which the constraint pressure from the constraining member is not applied in the fourth step as one means for solving the above problems.

In the producing method of the present disclosure, preferably, the position of the adhesive in the short-circuit current shunt part is determined in the first step so that the adhesive is provided outside the cathode material layer, the solid electrolyte layer, and the anode material layer in a view in the direction.

In the producing method of the present disclosure, preferably, each of the first and second current collector layers includes a current collector tab, and in the first step, the current collector tab is adhered to the insulating layer with the adhesive.

In the producing method of the present disclosure, preferably, in the view in the direction, an area of the first current collector layer excluding the current collector tab is smaller than that of the insulating layer, an area of the second current collector layer excluding the current collector tab is smaller than that of the insulating layer, and in the first step, the adhesive is provided in a zone in the insulating layer, the zone protruding to an outside of outer edges of the first and second current collector layers.

In the producing method of the present disclosure, preferably, the adhesive has a linear shape.

In the producing method of the present disclosure, preferably, in the first step, the first current collector layer, the insulating layer, the second current collector layer, the insulating layer, and the first current collector layer are stacked in this order.

In the producing method of the present disclosure, preferably, said at least one short-circuit current shunt part and a plurality of the electric elements are stacked, and electrically connected, and the electric elements are electrically connected in parallel.

In the producing method of the present disclosure, preferably, linearly providing the adhesive at part of one face, and at part of another face of the insulating layer along a longitudinal direction of the insulating layer, the insulating layer being belt-shaped; cutting the insulating layer, for which the adhesive is provided, into a plurality of rectangles; and stacking the first current collector layer onto the face of the insulating layer, for which the adhesive is provided, via the adhesive, to adhere the first current collector layer to the face with the adhesive, and stacking the second current collector layer onto the other face of the insulating layer, for which the adhesive is provided, via the adhesive, to adhere the second current collector layer to the other face with the adhesive, to make the short-circuit current shunt part.

Advantageous Effects of Invention

In the all-solid-state battery of this disclosure, adhesive in the short-circuit current shunt part is not arranged in the zone where constraint pressure is applied. That is, even if constraint pressure is applied, cracking etc. of the adhesive in the short-circuit current shunt part can be suppressed, and variation in properties inside the short-circuit current shunt part can be suppressed. In addition, in nail penetration testing, the first current collector layer can be more stably touched to the second current collector layer.

BRIEF DESCRIPTION OF DRAWINGS

FIG. 2A is an external perspective view, and FIG. 2B is a cross-sectional view taken along the line IIB-IIB;

FIG. 3A is an external perspective view, and FIG. 3B is a cross-sectional view taken along the line IIIB-IIIB;

FIGS. 6A and 6B are explanatory schematic views of a preferred example of the short-circuit current shunt part 10: FIG. 6A is a complete view, and FIG. 6B is an exploded view;

FIG. 9A corresponds to a step S1a, FIG. 9B corresponds to a step S1b, FIG. 9C corresponds to a step S1c, and FIG. 9D corresponds to a step S1d; FIG. 10A corresponds to the step S1a, FIG. 10B corresponds to the step S1b, FIG. 10C corresponds to the step S1c, and FIG. 10D corresponds to the step S1d.

DETAILED DESCRIPTION OF EMBODIMENTS

1. All-Solid-State Battery

Figure 1:
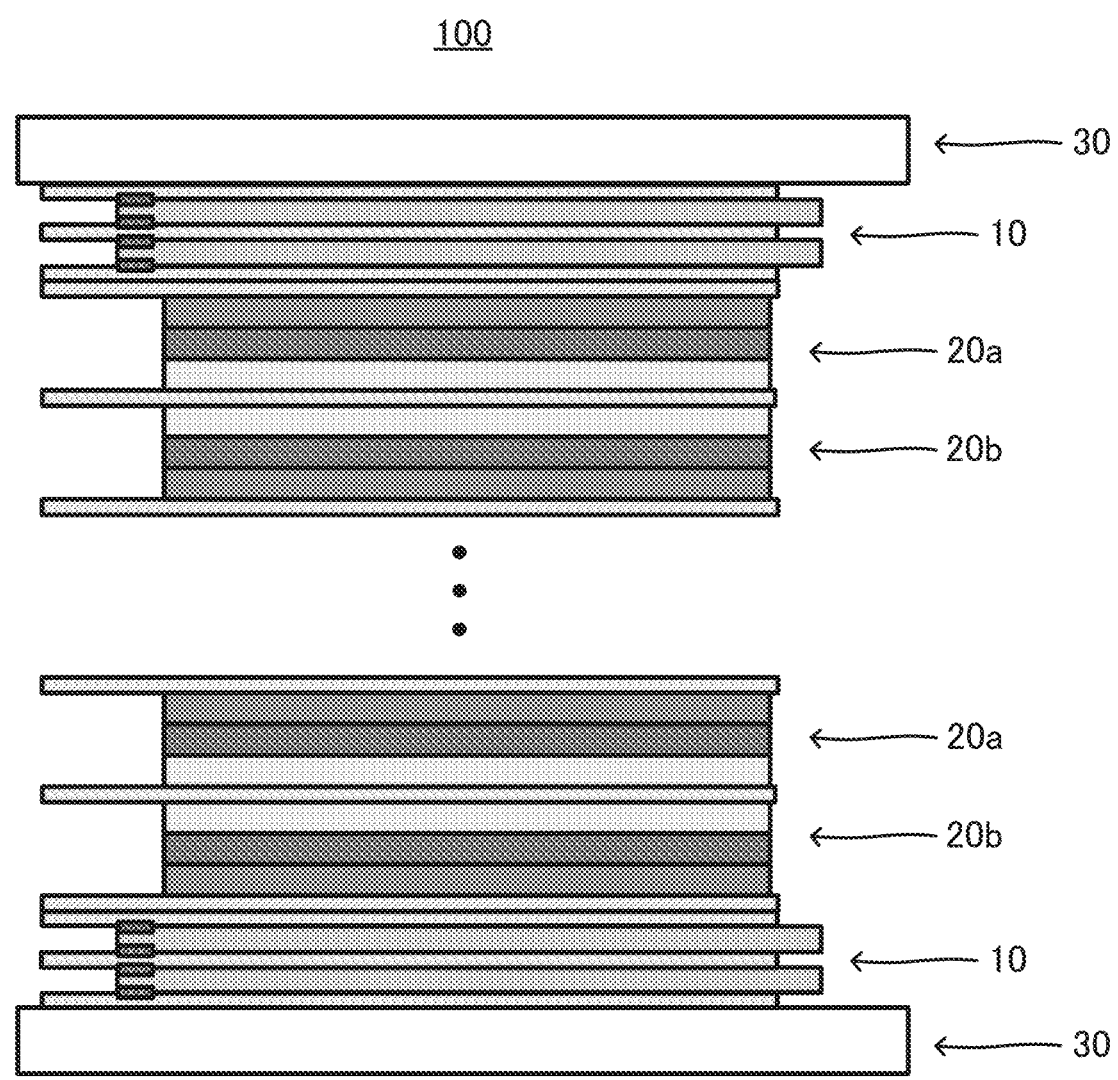
FIG. 1 is an explanatory schematic view of structure of layers of an all-solid-state battery 100.
Figure 2A:
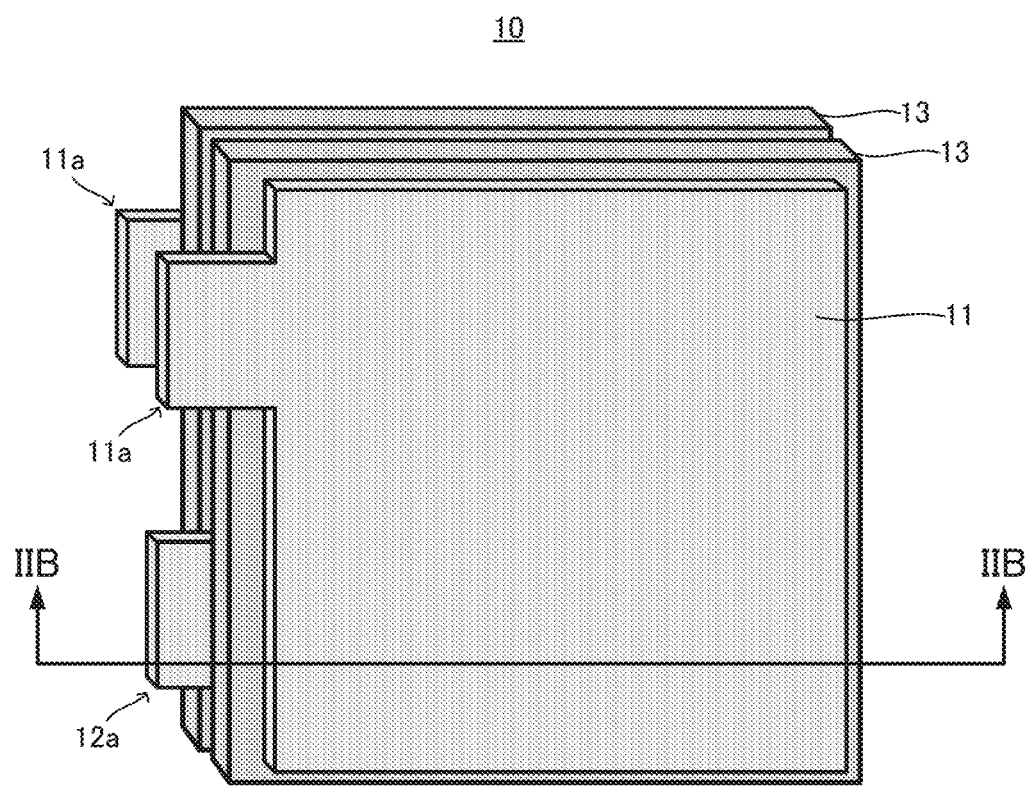
FIGS. 2A and 2B are explanatory schematic views of structure of layers of a short-circuit current shunt part 10.
Figure 2B:
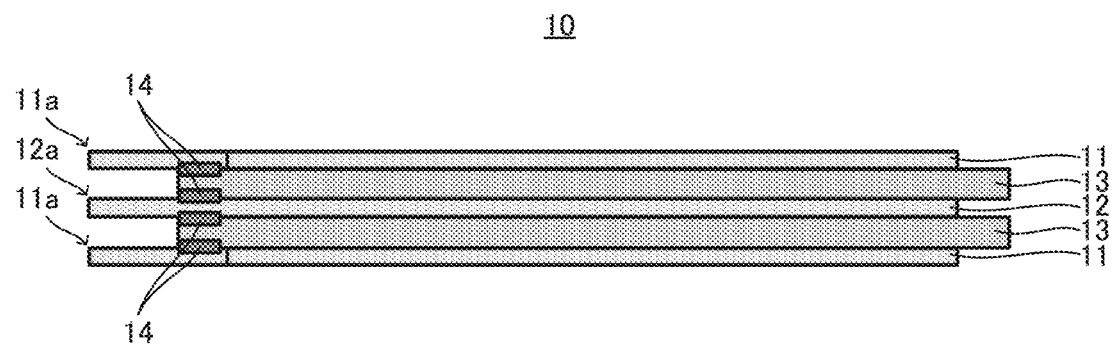
Figure 3A:
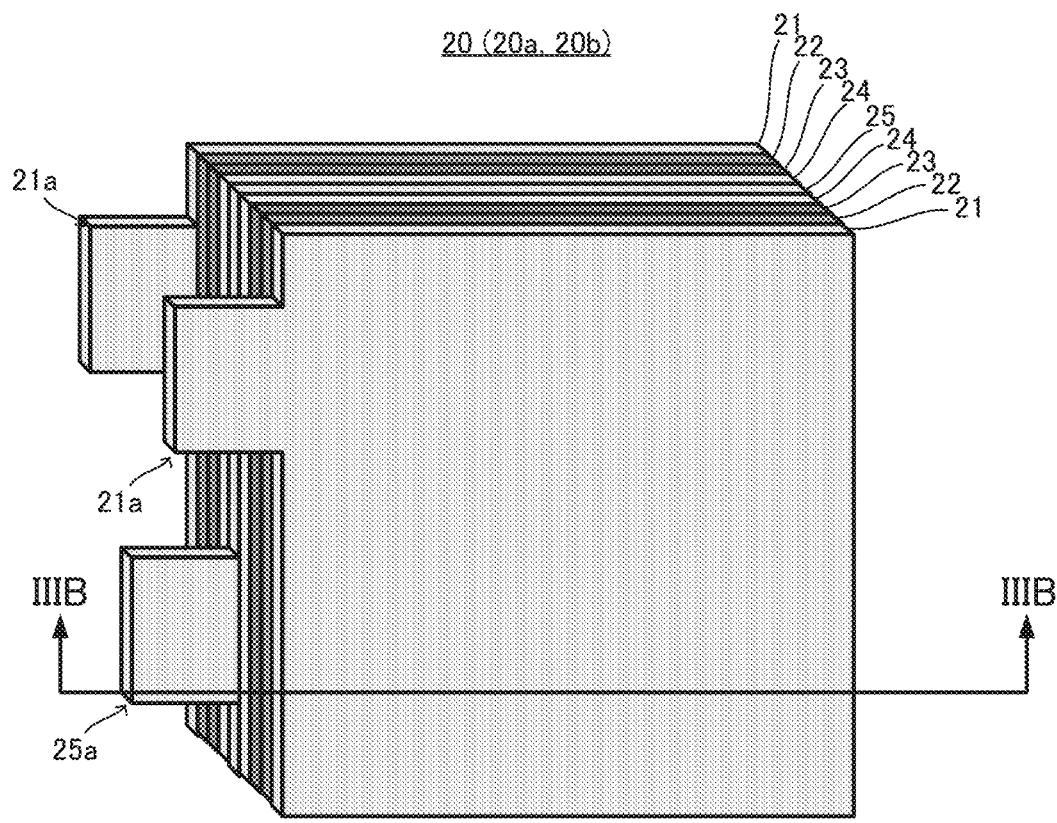
FIGS. 3A and 3B are explanatory schematic views of structure of layers of electric elements 20.
Figure 3B:
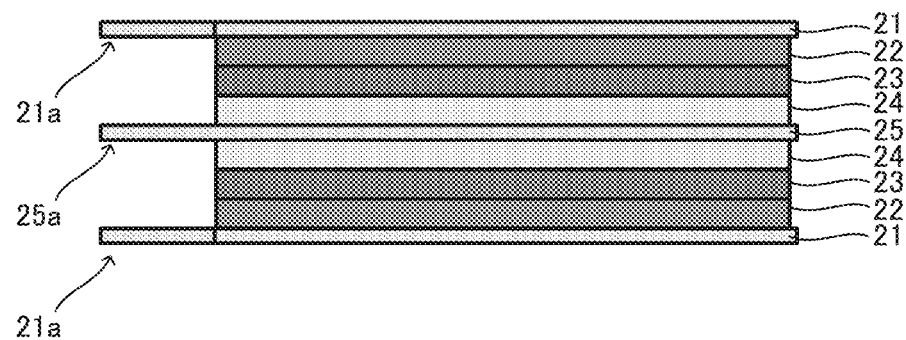
Figure 4:
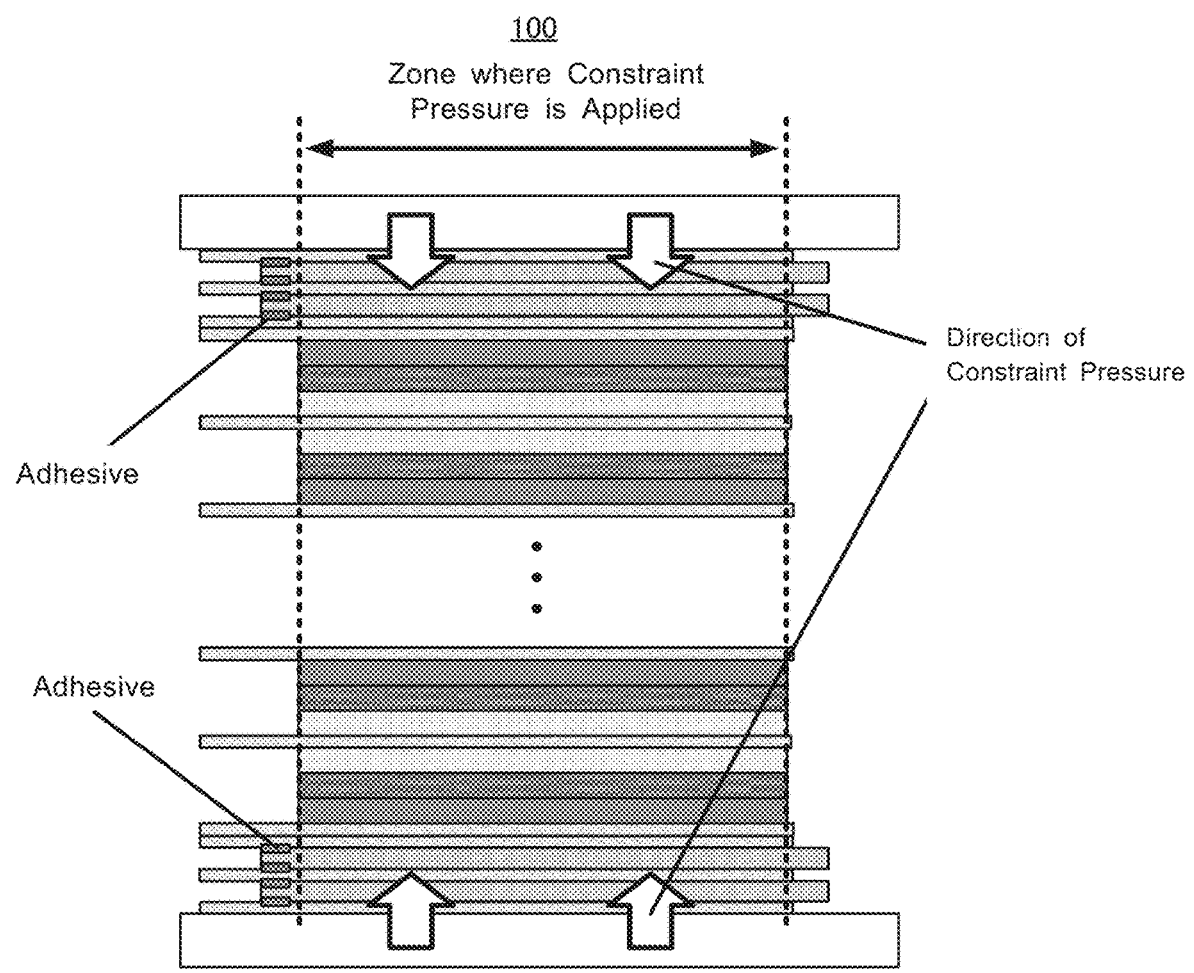
FIG. 4 is an explanatory schematic view of directions of constraint pressure, a zone where constraint pressure is applied, and positions of adhesive 14 in the all-solid-state battery 100.

FIG. 1 schematically shows structure of layers of an all-solid-state battery 100. In FIG. 1, portions where current collector layers (current collector tabs) are connected to each other, a battery case, etc. are omitted for convenient explanation. FIGS. 2A and 2B schematically show structure of layers of a short-circuit current shunt part 10 that composes the all-solid-state battery 100. FIG. 2A is an external perspective view, and FIG. 2B is a cross-sectional view taken along the line IIB-IIB. FIGS. 3A and 3B schematically show structure of layers of electric elements 20 that compose the all-solid-state battery 100. FIG. 3A is an external perspective view, and FIG. 3B is a cross-sectional view taken along the line IIIB-IIIB. FIG. 4 schematically shows directions of constraint pressure, and positional relationship between a zone where constraint pressure is applied, and adhesive in the all-solid-state battery 100.

As shown in FIGS. 1 to 4, the all-solid-state battery 100 includes the short-circuit current shunt parts 10 and the electric elements 20 which are stacked, and to the all-solid-state battery 100, constraint pressure is applied by a constraining member 30 in a stacking direction. Each short-circuit current shunt part 10 in the all-solid-state battery 100 includes first current collector layers 11, a second current collector layer 12, and insulating layers 13 provided between the first current collector layers 11 and the second current collector layer 12, all of which are stacked to be adhered with adhesive 14 along the stacking direction. The electric elements 20 in the all-solid-state battery 100 includes cathode current collector layers 21, cathode material layers 22, solid electrolyte layers 23, anode material layers 24, and an anode current collector layer 25, all of which are stacked along the stacking direction. In the all-solid-state battery 100, the first current collector layers 11 are electrically connected with the cathode current collector layers 21, and the second current collector layer 12 is electrically connected with the anode current collector layer 25. Here, a feature of the all-solid-state battery 100 is that the adhesive 14 is provided in a zone in the short-circuit current shunt part 10, to which the constraint pressure from the constraining member 30 is not applied.

1.1. Short-Circuit Current Shunt Part 10

As shown in FIGS. 2A and 2B, the short-circuit current shunt part 10 includes the first current collector layers 11, the second current collector layer 12, and the insulating layers 13 that are provided between the first current collector layers 11 and the second current collector layer 12. In the short-circuit current shunt part 10 having such structure, while the first current collector layers 11 are properly insulated from the second current collector layer 12 via the insulating layers 13 when the battery is normally used, the first current collector layers 11 and the second current collector layer 12 touch in short-circuiting due to nail penetration, which leads to low electric resistance.

1.1.1. First Current Collector Layers 11 and Second Current Collector Layer 12

The first current collector layers 11 and the second current collector layer 12 may be formed of metal foil, metal mesh, etc., and are especially preferably formed of metal foil. Metals that may form the current collector layers 11 and 12 include Cu, Ni, Al, Fe, Ti, Zn, Co, Cr, Au, Pt, stainless steel, etc. The current collector layers 11 and 12 may have some coating layers for adjusting contact resistance over their surfaces, which are, for example, formed of carbon.

The first current collector layers 11 and the second current collector layer 12 are not limited in terms of thickness, but for example, are preferably 0.1 μm to 1 mm, and are more preferably 1 μm to 100 μm in thickness. If being within this range in thickness, the current collector layers 11 and 12 can be more properly touched to each other in nail penetration testing, to more properly short-circuit the short-circuit current shunt part 10.

As shown in FIGS. 2A and 2B, the first current collector layers 11 include current collector tabs 11a, and are connected to the cathode current collector layers 21 of the electric elements 20 electrically via the current collector tabs 11a. On the other hand, the second current collector layer 12 includes a current collector tab 12a, and is connected to the anode current collector layers 25 of the electric elements 20 electrically via the current collector tab 12a. The current collector tabs 11a may be formed of either the same material as, or a different material from the first current collector layers 11. The current collector tab 12a may be formed of either the same material as, or a different material from the second current collector layer 12. In view of passing a larger rounding current to the short-circuit current shunt part 10 in nail penetration testing, electric resistance of the current collector tabs 11a and 12a is preferably lower than that of cathode current collector tabs 21a and an anode current collector tab 25a, which will be described later.

1.1.2. Insulating Layer 13

In the all-solid-state battery 100, the insulating layers 13 have only to insulate the first current collector layers 11 from the second current collector layer 12 when the battery is normally used. The insulating layers 13 may be insulating layers formed of organic material, inorganic material, or organic material and inorganic material coexisting therein. Specifically, the insulating layers 13 are preferably formed of organic material because using organic material is advantageous in view of a low probability of short circuits occurring due to cracking in normal use.

Organic material that can form the insulating layers 13 include various resins such as various thermoplastic resins and various thermosetting resins. Specifically, super engineering plastics such as polyimide, polyamide-imide, polyether ether ketone, and polyphenylene sulfide are preferable. Generally, thermosetting resin has higher thermal stability, and is harder and brittler than thermoplastic resin. That is, when being formed of thermosetting resin, the insulating layers 13 easily break when a nail is penetrated through the short-circuit current shunt part 10, which makes it possible to suppress the insulating layers 13 from following deformation of the first current collector layers 11 and the second current collector layer 12, to more easily touch the first current collector layers 11 to the second current collector layer 12. In addition, even if the temperature of the insulating layers 13 rises, thermal decomposition can be suppressed.

Inorganic material that can form the insulating layers 13 include various ceramics such as inorganic oxides. The insulating layers 13 may be formed of metal foil that has oxide coating over its surface. For example, aluminum foil that has aluminum oxide coating over its surface is obtained by anodizing the aluminum foil to form anodic oxide coating over the surface of the aluminum foil. In this case, the thickness of the oxide coating is preferably 0.01 μm to 5 μm. The lower limit thereof is more preferably no less than 0.1 μm, and the upper limit thereof is more preferably no more than 1 μm.

The thickness of each insulating layer 13 is not specifically limited, but for example, is preferably 0.1 μm to 1 mm, and is more preferably 1 μm to 100 μm. The thickness of each insulating layer 13 within this range makes it possible to more properly insulate the first current collector layers 11 from the second current collector layer 12 when the battery is normally used, and can lead to more proper continuity between the first current collector layers 11 and the second current collector layer 12 according to deformation due to external stress such as nail penetration, to cause internal short circuits.

1.1.4. Adhesive 14

As shown in FIG. 2B, the adhesive 14 is provided between the first current collector layers 11 and the insulating layers 13, and between the second current collector layer 12 and the insulating layers 13 in the short-circuit current shunt part 10. Adhesive components that compose the adhesive 14 are not specifically restricted. The adhesive 14 may be applied, and may be adhesive tape or the like. For example, a binder solution prepared by dissolving a binder in a solvent is applied to positions between the current collector layers 11 and 12, and the insulating layers 13, to be dried, whereby the adhesive 14 can be provided. In this case, a solvent that can be used when the all-solid-state battery is made is preferably used as the solvent because reaction of the solvent and material of the all-solid-state battery (solid electrolyte etc.) inside the battery can be prevented even if the solvent remains. For example, the solvent is preferably heptane, butyl butyrate, or the like. The binder has only to be dissolved in the solvent. For example, various hydrogenated modified polymers can be used, Preferably, the adhesive 14 can be easily removed from the current collector layers 11 and/or 12, and/or the insulating layers 13, and can keep its adhesion even after removed (have readhesion). Whereby, operation of adhering the current collector layers 11 and 12, and the insulating layers 13 becomes easy. Positions of the adhesive 14 in the short-circuit current shunt part 10 will be described in more detail later.

1.2. Electric Elements 20

Each electric element 20 is formed by stacking the cathode current collector layer 21, the cathode material layer 22, the solid electrolyte layer 23, the anode material layer 24, and the anode current collector layer 25. That is, each electric element 20 can function as a single cell.

1.2.1. Cathode Current Collector Layer 21

The cathode current collector layer 21 may be formed of metal foil, metal mesh, etc., and are especially preferably formed of metal foil. Metals that may form the cathode current collector layer 21 include Ni, Cr, Au, Pt, Al, Fe, Ti, Zn, stainless steel, etc. The cathode current collector layer 21 may have some coating layer for adjusting contact resistance over its surface, which is, for example, carbon coating. The thickness of the cathode current collector layer 21 is not limited, but for example, is preferably 0.1 μm to 1 mm, and is more preferably 1 μm to 100 μm.

As shown in FIGS. 3A and 3B, the cathode current collector layer 21 includes a cathode current collector tab 21a at part of an outer edge thereof. The tab 21a makes it possible to electrically connect the first current collector layers 11 and the cathode current collector layer 21 easily, and to electrically connect the cathode current collector layers 21 to each other easily in parallel.

1.2.2. Cathode Material Layer 22

The cathode material layer 22 contains at least active material, and further contains a solid electrolyte, a binder, and a conductive additive optionally. Known active material may be used as the active material. One may select two materials different in electric potential at which predetermined ions are stored and released (charge and discharge potential) among known active materials, to use a material displaying noble potential as cathode active material, and a material displaying base potential as anode active material described later. For example, when a lithium ion battery is configured, various lithium containing composite oxides such as lithium cobaltate, lithium nickelate, $LiNi_{1/3}Co_{1/3}Mn_{1/3}O_2$, lithium manganate, and spinel lithium compounds can be used as the cathode active material. The surface of the cathode active material may be coated with an oxide layer such as a lithium niobate layer, a lithium titanate layer, and a lithium phosphate layer. The solid electrolyte is preferably an inorganic solid electrolyte. This is because ion conductivity of inorganic solid electrolytes is higher compared with organic polymer electrolytes. This is also because inorganic solid electrolytes are superior in heat resistance compared with organic polymer electrolytes. This is moreover because pressure applied to the electric elements 20 in nail penetration testing is higher compared to the case using an organic polymer electrolyte, which makes the effect of the all-solid-state battery 100 of the present disclosure outstanding, Examples of inorganic solid electrolytes include solid electrolytes of oxides such as lithium lanthanum zirconate, and solid electrolytes of sulfides such as $Li_2S$—$P_2S_5$. Especially, a sulfide solid electrolyte containing $Li_2S$—$P_2S_5$ is preferable, and a sulfide solid electrolyte containing no less than 50 mol % of $Li_2S$—$P_2S_5$ is more preferable. As the binder, various binders such as butadiene rubber (BR), acrylate-butadiene rubber (ABR), and polyvinylidene difluoride (PVdF) can be used. Carbon materials such as acetylene black and ketjenblack, and metallic materials such as nickel, aluminum and stainless steel can be used as the conductive additive. The contents of the constituents in the cathode material layer 22 may be the same as in a conventional layer. The shape of the cathode material layer 22 may be the same as a conventional layer as well. Specifically, from the viewpoint that the all-solid-state battery 100 can be easily configured, the cathode material layer 22 is preferably a sheet. In this case, the thickness of the cathode material layer 22 is, for example, preferably 0.1 µm to 1 mm, and more preferably 1 µm to 150 µm.

1.2.3. Solid Electrolyte Layer 23

The solid electrolyte layer 23 contains a solid electrolyte, and optionally a binder. The solid electrolyte is preferably the above described inorganic solid electrolyte. The same binder used for the cathode material layer 22 may be properly selected to be used as the binder. The contents of the constituents in the solid electrolyte layer 23 may be the same as in a conventional layer. The shape of the solid electrolyte layer 23 may be the same as a conventional layer as well. Specifically, from the viewpoint that the all-solid-state battery 100 can be easily configured, the solid electrolyte layer 23 is preferably a sheet. In this case, the thickness of the solid electrolyte layer 23 is, for example, preferably 0.1 µm to 1 mm, and more preferably 1 µm to 150 µm.

1.2.4. Anode Material Layer 24

The anode material layer 24 contains at least active material, and further contains a solid electrolyte, a binder, and a conductive additive optionally. Known active material may be used as the active material. One may select two materials different in electric potential at which predetermined ions are stored and released (charge and discharge potential) among known active materials, to use a material displaying noble potential as the above described cathode active material, and a material displaying base potential as the anode active material. For example, when a lithium ion battery is configured, carbon materials such as graphite and hard carbon, various oxides such as lithium titanate, Si and Si alloys, or metal lithium and lithium alloys can be used as the anode active material. The same solid electrolyte, binder, and conductive additive used for the cathode material layer 22 can be properly selected to be used. The contents of the constituents in the anode material layer 24 may be the same as in a conventional layer. The shape of the anode material layer 24 may be the same as a conventional layer as well. Specifically, from the viewpoint that the all-solid-state battery 100 can be easily configured, the anode material layer 24 is preferably a sheet. In this case, the thickness of the anode material layer 24 is, for example, preferably 0.1 µm to 1 mm, and more preferably 1 µm to 100 µm. The thickness of the anode material layer 24 is preferably determined so that the capacity of the anode is larger than that of the cathode, 1.2.5. Anode Current Collector Layer 25

The anode current collector layer 25 may be formed of metal foil, metal mesh, etc., and is especially preferably formed of metal foil. Metals that may form the anode current collector layer 25 include Cu, Ni, Fe, Ti, Co, Zn, and stainless steel. The anode current collector layer 25 may have some coating layer for adjusting contact resistance over its surface, which is, for example, carbon coating. The thickness of the anode current collector layer 25 is not limited, but for example, is preferably 0.1 µm to 1 mm, and is more preferably 1 µm to 100 µm.

As shown in FIGS. 3A and 3B, the anode current collector layer 25 includes an anode current collector tab 25a at part of an outer edge thereof. The tab 25a makes it possible to electrically connect the second current collector layer 12 to the anode current collector layer 25 easily, and to electrically connect the anode current collector layers 25 to each other easily in parallel.

1.3. Constraining Member

The constraining member 30 has only to be able to apply constraint pressure in the stacking direction of the all-solid-state battery 100, and its shape is not specifically restricted.

For example, the screwing constraining member 30 that includes boardlike parts that hold both end sides of the all-solid-state battery 100 in the stacking direction, sticklike part that couples the boardlike parts (not show a d an adjustment part that is coupled to the sticklike part, and adjusts a space between the boardlike parts by a screwing structure or the like (not shown) can be used. FIG. 1 shows the structure that the constraining member 30 touches the short-circuit current shunt parts 10 as an example in the all-solid-state battery 100. However, a manner of installing the constraining member 30 is not restricted to this. The constraining member 30 may constrain the short-circuit current shunt parts 10 and the electric elements 20 via a battery case. Alternatively, the constraining member 30 may constrain the short-circuit current shunt parts 10 and the electric elements 20 via some member other than a battery case.

Alternatively, the constraining member may constrain the short-circuit current shunt parts 10 and the electric elements 20 by pressure from a fluid of high pressure, with which the inside of a battery case (space between the short-circuit current shunt parts 10, the electric elements 20, and the inner wall of the case) is filled. In this case, fluids that do not cause unnecessary reaction for battery material are preferable. For example, the fluid is an inert gas such as nitrogen, dry air, or the like.

Alternatively, one may arrange a compressed elastic member inside a battery case, and apply constraint pressure to the short-circuit current shunt parts 10 and the electric elements 20 by expansion force of this elastic member. In this case, the elastic member may be a rubber sheet, or the like.

1.4. Arrangement and Connection Manner of Short-Circuit Current Shunt Part and Electric Elements

1.4.1. Arrangement of Electric Elements

In the all-solid-state battery 100, the number of stacking the electric elements 20 is not limited, but may be properly determined according to the power of the battery to be aimed. In this case, a plurality of the electric elements 20 may be stacked so as to directly touch to each other, and may be stacked via some layers (for example, insulating layers) spaces (air spaces). In view of improving the power density of the battery, a plurality of the electric elements 20 are preferably stacked so as to directly touch to each other as shown in FIG. 1. As shown in FIGS. 1, 3A and 3B, two electric elements 20a and 20b preferably share the anode current collector 25, which further improves the power density of the battery. Further, as shown in FIG. 1, in the all-solid-state battery 100, a direction of stacking a plurality of the electric elements 20 is the same as that of stacking the layers 21 to 25 of the electric elements 20, which makes it easy to constrain the all-solid-state battery 100, to further improve the power density of the battery.

1.4.2. Electric Connection of Electric Elements Each Other

In the all-solid-state battery 100, preferably, a plurality of the electric elements 20, 20, . . . are electrically connected to each other in parallel. In the electric elements connected in parallel as described above, when one electric element short-circuits, electrons concentratedly flow into the one electric element from the other electric elements. That is, Joule heating is easy to be large when the battery short-circuits. In other words, in the all-solid-state battery 100 including a plurality of the electric elements 20, 20, . . . connected in parallel as described above, the effect of providing the short-circuit current shunt part 10 is more outstanding. A conventionally known member may be used as a member for electrically connecting the electric elements 20 to each other. For example, as described above, one can provide the cathode current collector tabs 21a for the cathode current collector layers 21, and the anode current collector tabs 25a for the anode current collector layers 25, to electrically connect the electric elements 20 to each other in parallel via the tabs 21a and 25a.

1.4.3. Electric Connection of Short-Circuit Current Shunt Part and Electric Elements In the all-solid-state battery 100, the first current collector layers 11 of the short-circuit current shunt parts 10 are electrically connected with the cathode current collector layers 21 of the electric elements 20, and the second current collector layers 12 of the short-circuit current shunt parts 10 are electrically connected with the anode current collector layers 25 of the electric elements 20. Electric connection of the short-circuit current shunt parts 10 and the electric elements 20 like this makes it possible to produce a large rounding current from the other electric elements (for example, the electric element 20b) to the short-circuit current shunt part 10 when the short-circuit current shunt part 10 and some electric elements (for example, the electric element 20a) short-circuit, for example. A conventionally known member may be used as a member for electrically connecting the short-circuit current shunt parts 10 and the electric elements 20. For example, as described above, one can provide the first current collector tabs 11a for the first current collector layers 11, and the second current collector tab 12a for the second current collector layer 12, to electrically connect the short-circuit current shunt part 10 and the electric elements 20 via the tabs 11a and 12a.

1.4.4. Positional Relationship between Short-Circuit Current Shunt Part and Electric Elements The short-circuit current shunt part 10 and a plurality of the electric elements 20, 20, . . . have only to be stacked to each other. In this case, the short-circuit current shunt part 10 and the electric elements may be directly stacked, or indirectly stacked via other layers (insulating layers, heat insulating layers, etc.). The short-circuit current shunt part 10 may be stacked either outside, between, or both outside and between a plurality of the electric elements 20, 20, . . . . Especially, as shown in FIG. 1, when the short-circuit current shunt parts 10 and a plurality of the electric elements 20, 20, . . . are stacked, at least one short-circuit current shunt part 10 is preferably provided outside a plurality of the electric elements 20, 20, . . . . Whereby in nail penetration testing, the short-circuit current shunt part 10 short-circuits before the electric elements 20, 20, . . . , which make it possible to generate a rounding current from the electric elements 20 to the short-circuit current shunt part 10, and to suppress heat generation inside the electric elements 20.

Short circuits of the battery due to nail penetration are easy to occur when the nail is penetrated from the cathode current collector layers 21 toward the anode current collector layers 25 of the electric elements 20 (or from the anode current collector layers 25 toward the cathode current collector layers 21). In this point, in the all-solid-state battery 100, a direction of nail penetration is the same as that of stacking the layers. More specifically, in the all-solid-state battery 100, the following directions are the same: the direction of stacking the cathode current collector layer 21, the cathode material layer 22, the solid electrolyte layer 23, the anode material layer 24, and the anode current collector layer 25 in each electric element 20; the direction of stacking a plurality of the electric elements 20; the direction of stacking the first current collector layers 11, the insulating layers 13, and the second current collector layer 12 in the short-circuit current shunt part 10; and the direction of stacking the short-circuit current shunt parts 10 and a plurality of the electric elements 20, 20, . . . .

1.4.5. Relationship between Short-Circuit Current Shunt Part and Electric Elements in Size In the all-solid-state battery 100, the short-circuit current shunt parts 10 cover as much part of the electric elements 20 as possible, which makes it easy to short-circuit the short-circuit current shunt part 10 before the electric elements 20 in nail penetration. For example, in the all-solid-state battery 100, the outer edge of the short circuit current shunt part 10 preferably exists outside the outer edges of the electric elements 20, 20, . . . when viewed in the direction of stacking the short circuit current shunt part 10 and a plurality of the electric elements 20, 20, . . . . Alternatively, as shown in FIG. 1, when the direction of stacking a plurality of the electric elements 20, 20, . . . is the same as that of stacking the layers 21 to 25 in the electric elements 20, it is better that the outer edge of the short-circuit current shunt part 10 exists outside the outer edges of the cathode material layers 22, the solid electrolyte layers 23, and the anode material layers 24 when viewed in the direction of stacking the short-circuit current shunt part 10 and a plurality of the electric elements 20, 20, . . . . Whereby, as shown in FIGS. 1 and 4, a zone to which the constraint pressure is not applied can be provided in the vicinity of the outer edge of the short-circuit current shunt part 10, and the adhesive 14 can be provided in this zone.

1.5. Positions of Adhesive in Short-Circuit Current Shunt Part

Positions of the adhesive 14 in the short-circuit current shunt parts 10, which are a feature of the all-solid-state battery 100 of this disclosure, will be described. As shown in FIG. 4, it is important that the adhesive 14 is provided in the zone to which the constraint pressure from the constraining member 30 is not applied in the short-circuit current shunt parts 10. Whereby, cracking of the adhesive 14 due to the constraint pressure can be suppressed, and variation in properties inside the short-circuit current shunt parts 10 can be suppressed.

For example, as shown in FIG. 4, the adhesive 14 is positioned outside the zone to which the constraint pressure from the constraining member 30 is applied, by providing the adhesive 14 outside the cathode material layers 22, the solid electrolyte layers 23, and the anode material layers 24 in a view in the stacking direction of the all-solid-state battery 100.

Figure 5:
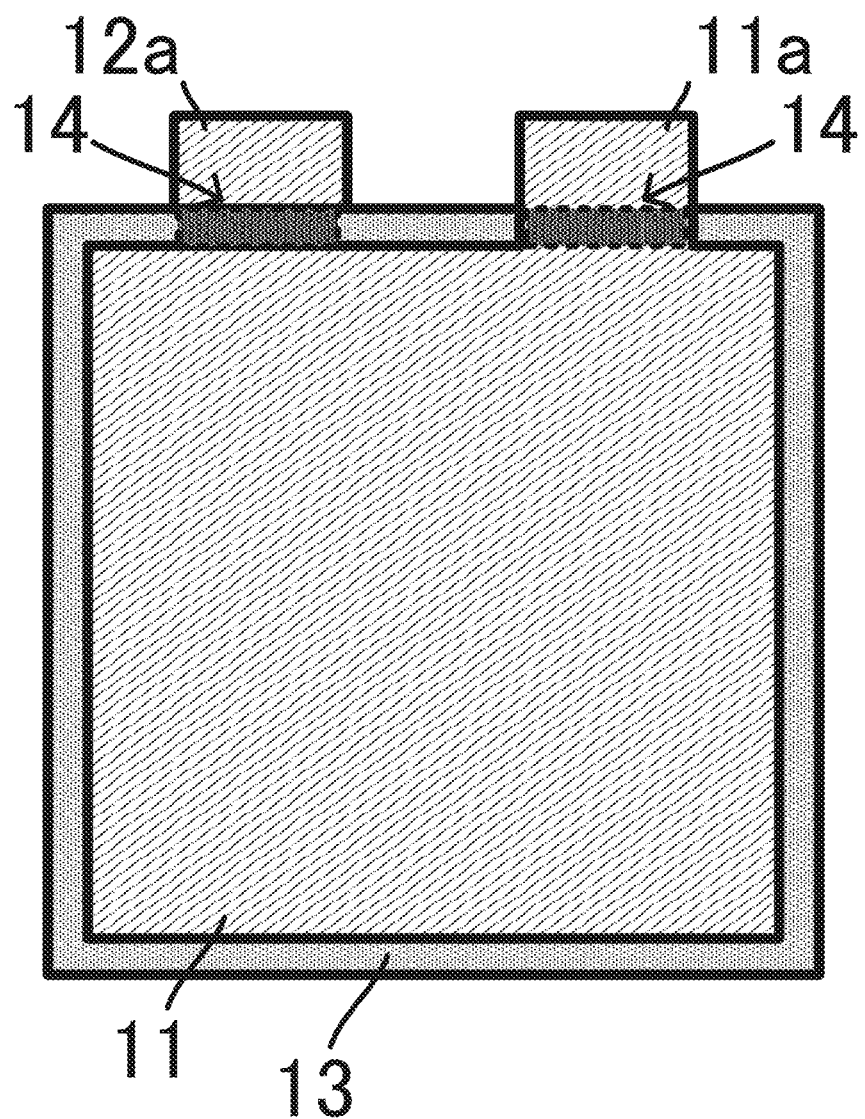
FIG. 5 is an explanatory schematic view of a specific example of the positions of the adhesive 14.

Alternatively, as shown in FIG. 5, the adhesive 14 is provided for the current collector tabs 11a and 12a, which makes positions of the adhesive 14 outside the zone to which the constraint pressure from the constraining member 30 is applied. In this case, the positions of the adhesive 14 at the current collector tabs 11a and 12a are not restricted, but as shown in FIG. 5, the adhesive 14 is preferably provided at the bases of the current collector tabs 11a and 12a. Whereby, the areas over which the adhesive 14 is provided can be as small as possible, to improve deposited energy density of the battery.

Specifically, as shown in FIG. 5, in the view in the stacking direction of the all-solid-state battery 100, preferably, an area of the first current collector layer 11 excluding the current collector tab 11a is smaller than that of the insulating layer 13, and an area of the second current collector layer 12 excluding the current collector tab 12a is smaller than that of the insulating layer 13. Whereby, the adhesive 14 can be provided in a zone in the insulating layer 13 which protrudes to the outside of the outer edges of the first current collector layer 11 and the second current collector layer 12.

The adhesive 14 preferably has a linear shape as well because it is believed that adhesive strength is improved more than the case where the adhesive 14 is locally provided, and the productivity of the short-circuit current shunt part 10 is improved as described later. For example, as shown in FIGS. 6A and 6B, it is better to provide the adhesive 14 in the vicinity of the outer edges of the insulating layers 13 so that the adhesive 14 is along straight lines of the outer edges. In this case, as shown in FIG. 6A, the adhesive 14 is provided between the current collector tabs 11a and 12a, and the insulating layers 13. Preferably, it is better that: in the view in the stacking direction of the all-solid-state battery 100, the area of the first current collector layer 11 excluding the current collector tab 11a is smaller than that of the insulating layer 13, and the area of the second current collector layer 12 excluding the current collector tab 12a is smaller than that of the insulating layer 13; and the adhesive 14 is linearly provided in a zone in the insulating layer 13 which protrudes to the outside of the outer edges of the first current collector layers 11 and the second current collector layer 12, and between the current collector tabs 11a and 12a, and the insulating layers 13. This linear adhesive 14 makes it possible to sufficiently secure adhesive strength, and to reduce defects such as removal.

Figure 9A:
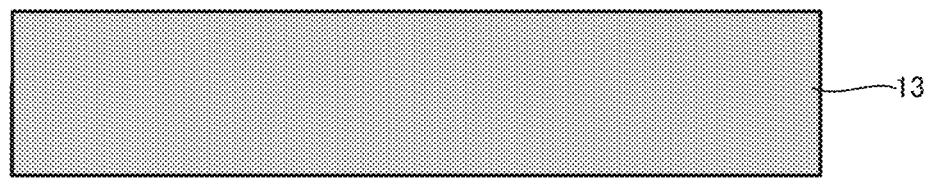
FIGS. 9A to 9D are explanatory top schematic views of the flow of the preferred method for producing the short-circuit current shunt part 10.
Figure 9B:
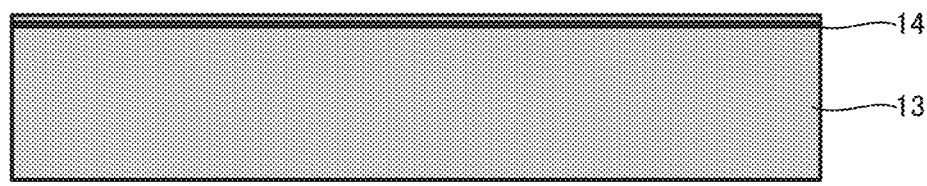
Figure 9C:
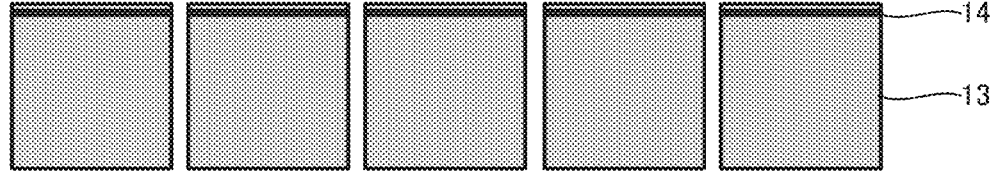
Figure 9D:
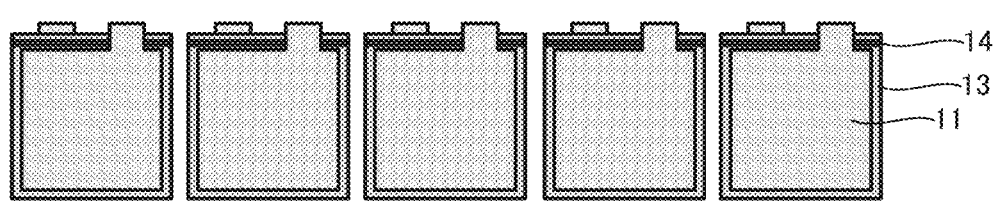

In this case, as shown in FIG. 6A, while partially contributing to adhesion of the current collector tabs 11a and 12a, and the insulating layers 13, the adhesive 14 is partially exposed at surfaces. Even such partial exposure of the adhesive 14 does not badly affect the performance of the all-solid-state battery 100 at all. Rather, as shown in FIG. 6B, the insulating layers 13, 13 are adhered to each other via the adhesive 14 if the short-circuit current shunt part is configured by five layers (see FIG. 9D), which is believed to make the adhesive strength of the short-circuit current shunt part 10 as a whole improved. In this point, it can be said that the short-circuit current shunt part 10 preferably has five-layer structure of the first current collector layer 11, the insulating layer 13, the second current collector layer 12, the insulating layer 13, and the first current collector layer 11, which are stacked in this order, in the all-solid-state battery 100 as shown in FIGS. 1 to 4.

As described above, in the all-solid-state battery 100, the adhesive 14 in the short-circuit current shunt part 10 is not arranged over the zone to which the constraint pressure is applied by the constraining member 30. That is, even if the constraint pressure is applied, cracking etc. of the adhesive 14 in the short-circuit current shunt part 10 can be suppressed, and variation in properties inside the short-circuit current shunt part 10 can be suppressed. In addition, in nail penetration testing, the current collector layers 11 can be more stably touched to the second current collector layer 12.

2. Method for Producing All-Solid-State Battery

Figure 7:
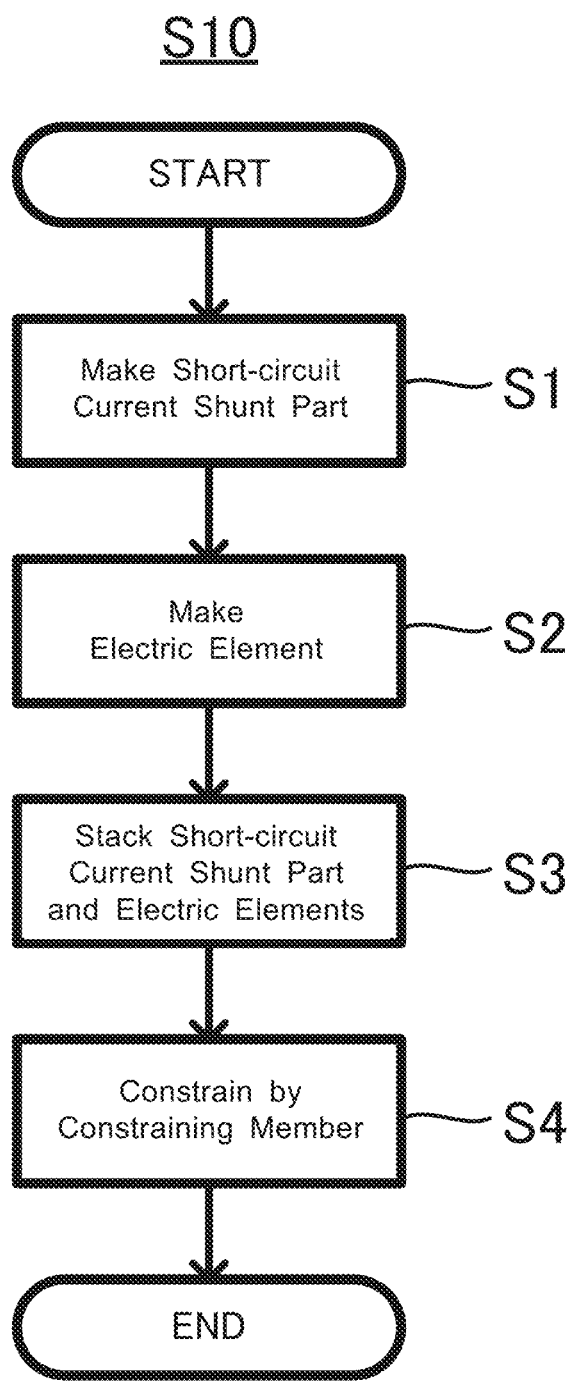
FIG. 7 explanatorily shows an example of a flow of a method for producing the all-solid-state battery 100.
Figure 8:
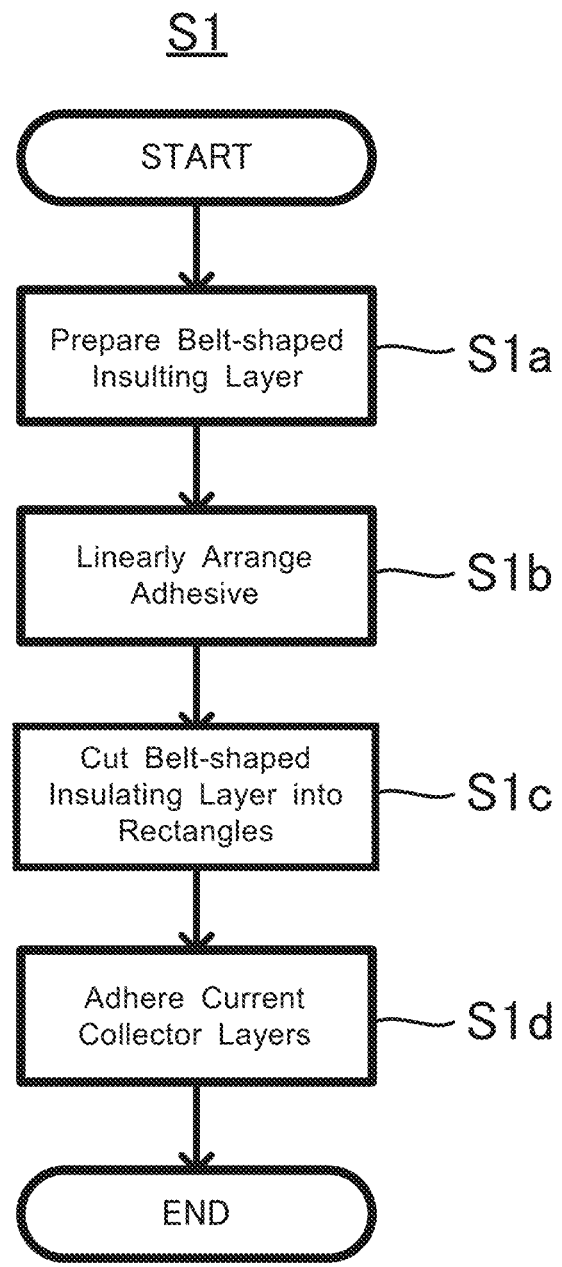
FIG. 8 explanatorily shows a flow of a preferred method for producing the short-circuit current shunt part 10.

FIG. 7 shows a flow of an example of a method for producing the all-solid-state battery 100 (producing method S10). As shown in FIG. 7, the producing method S10 includes a first step S1 of stacking the first current collector layers 11, the insulating layers 13, and the second current collector layer 12, and adhering them with the adhesive 14, to make the short-circuit current shunt part 10; a second step S2 of stacking the cathode current collector layer 21, the cathode material layer 22, the solid electrolyte layer 23, the anode material layer 24, and the anode current collector layer 25, to make each electric element 20; a third step S3 of stacking the short-circuit current shunt part 10 and the electric elements 20 along the direction of stacking the layers; and a fourth step S4 of constraining the stacked short-circuit current shunt part 10 and electric elements 20 by the constraining member 30, and at the same time applying constraint pressure along the stacking direction. It is important in the producing method S10 that positions where the adhesive 14 is provided for the short-circuit current shunt part 10 are determined in the first step so that the adhesive is arranged in the zone to which the constraint pressure from the constraining member 30 is not applied in the fourth step.

2.1. First Step S1

The first step S1 is a step of stacking the first current collector layers 11, the insulating layers 13, and the second current collector layer 12, and adhering them with the adhesive 14, to make the short-circuit current shunt part 10.

The short-circuit current shunt part 10 can be easily made by arranging the insulating layers 13 (for example, insulating film) between the first current collector layers 11 (for example, metal foil) and the second current collector layer 12 (for example, metal foil), and adhering them with the adhesive 14 (made by applying to dry a binder solution, for example). As shown in FIG. 6B, one may arrange the insulating layers 13, 13 over both faces of the second current collector layer 12, and further arrange the first current collector layers 11, 11 over the surfaces of the insulating layers 13, 13 which are on the opposite sides of the second current collector layer 12.

In the first step S1, positions of the adhesive 14 that is provided for the short-circuit current shunt part 10 are determined so that the adhesive 14 is arranged in the zone where the constraint pressure from the constraining member 30 is not applied in the fourth step. For example, as shown in FIG. 4, positions of the adhesive 14 in the short-circuit current shunt part 10 is preferably determined in the first step S1 so that the adhesive 14 is provided outside the cathode material layers 22, the solid electrolyte layers 23, and the anode material layers 24 in the view in the stacking direction of the all-solid-state battery 100.

Alternatively, as shown in FIG. 5, when the first current collector layers 11 and the second current collector layer 12 include the current collector tabs 11a and 12a, respectively, the current collector tabs 11a and 12a are preferably adhered to the insulating layers 13 via the adhesive 14 in the first step S1.

As shown in FIG. 5, when the area of the first current collector layer 11 excluding the current collector tab 11a is smaller than that of the insulating layer 13, and the area of the second current collector layer 12 excluding the current collector tab 12a is smaller than that of the insulating layer 13 in the view in the stacking direction of the all-solid-state battery 100, the adhesive 14 is preferably provided in the zone in the insulating layer 13 which protrudes to the outside of the outer edges of the first current collector layer 11 and the second current collector layer 12 in the first step S1.

As described above, the adhesive preferably has a linear shape in the first step S1. Further, as described above, the first current collector layer 11, the insulating layer 13, the second current collector layer 12, the insulating layer 13, and the first current collector layer 11 are preferably stacked in this order in the first step S1 (FIG. 6B).

2.2 Second Step S2

The second step S2 is a step of stacking the cathode current collector layer 21, the cathode material layer 22, the solid electrolyte layer 3, the anode material layer 24, and the anode current collector layer 25, to make each electric element 20.

Each electric element 20 can be made by any known method. For example, one may form the cathode material layer 22 by coating the surface of the cathode current collector layer 21 with cathode material in a wet process, to dry the resultant, form the anode material layer 24 by coating the surface of the anode current collector layer 25 with anode material in a wet process, to dry the resultant, transfer the solid electrolyte layer 23 containing a solid electrolyte etc. between the cathode material layer 21 and the anode material layer 24, and integrally press-form the layers, to make the electric element 20 as a stack of the cathode current collector layer 21, the cathode material layer 22, the solid electrolyte layer 23, the anode material layer 24, and the anode current collector layer 25. Pressing pressure at this time is not limited, but for example, is preferably no less than 2 ton/cm$^2$. These making procedures are just an example, and the electric element 20 can be made by procedures other than them as well. For example, the cathode material layer etc. can be formed by a dry process instead of a wet process. Methods for producing the electric element 20 themselves are widely known by the person skilled in the art, and thus more detailed description is omitted.

2.3. Third Step S3

The third step S3 is a step of stacking the short-circuit current shunt part 10 and the electric elements 20 along the direction of stacking the layers. The third step S3 is obvious for the person skilled in the art who refers to the description of the present application etc., and thus detailed description is omitted.

The short-circuit current shunt part 10 and the electric elements 20 may be electrically connected to each other in the third step S3, in the fourth step S4 described later, or after the fourth step S4. For example, it is preferable to stack at least one short-circuit current shunt part 10 and a plurality of the electric elements 20, 20, . . . , to electrically connect the short-circuit current shunt part 10 and the electric elements 20, and to electrically connect a plurality of the electric elements 20, 20, . . . in parallel. A method for electrically connecting the short-circuit current shunt part 10 and the electric elements 20 is not restricted. For example, electric connection of the tabs to each other by gathering the current collection tabs (gathering tabs in a place, to bundle them) makes it possible to electrically connect the short-circuit current shunt part 10 and the electric elements 20. Alternatively, as shown in FIGS. 2A to 3B, holding conductive material between the tabs protruding from the side faces of the stacks makes it possible to electrically connect the tabs to each other. Timing of electrically connecting the short-circuit current shunt part 10 and the electric elements 20 may be after the step S4, which will be described later.

2.4. Fourth Step S4

The fourth step S4 is a step of constraining the stacked short-circuit current shunt part 10 and electric elements 20 by the constraining member 30, and at the same time applying the constraint pressure along the stacking direction. A manner of constraint by the constraining member 30 is as described above. The fourth step S4 may be carried out before the stacked short-circuit current shunt part 10 and electric elements 20 are enclosed in a battery case of laminate film, a stainless steel can, or the like, to enclose the short-circuit current shunt part 10 and the electric elements 20 in the battery case together with the constraining member 30; or, after the short-circuit current shunt part 10 and the electric elements 20 are enclosed in the battery case, the constraint pressure may be applied by the constraining member 30 from the outside of the battery case. The fourth step S4 is obvious for the person skilled in the art who refers to the description of the present application etc., and thus description thereof is omitted here.

Through the above described first step S1 to fourth step S4, the all-solid-state battery 100 can be easily produced. In the present application, "first", "second", and so on do not represent order thereof. In the producing method S10, the first step S1 and the second step S2 may be reversed in order.

2.5. Preferred Embodiment of First Step S1

Figure 10A:
FIGS. 10A to 10D are explanatory side schematic views of the flow of the preferred method for producing the short-circuit current shunt part 10.
Figure 10B:
Figure 10C:
Figure 10D:
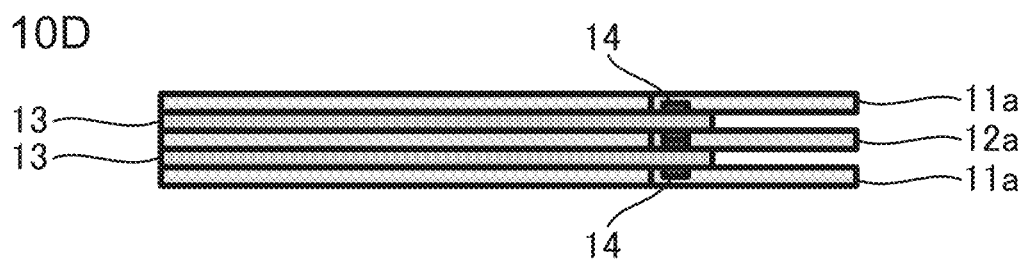

FIGS. 8 to 10D show the flow of the first step S1 according to the preferred embodiment. As shown in FIGS. 8 to 10D, in the preferred embodiment, the first step S1 includes steps S1a and S1b of linearly providing the adhesive 14 at part of one face, and at part of the other face of a belt-shaped insulating layer 13 along a longitudinal direction of the insulating layer 13 (FIGS. 9A, 9B, 10A and 10B); a step S1c of cutting the belt-shaped insulating layer 13, for which the adhesive 14 is provided, into a plurality of rectangles (FIGS. 9C and 10C); and a step S1d of stacking the first current collector layers 11 onto a face of each insulating layer 13, for which the adhesive 14 is provided, via the adhesive 14, to adhere the first current collector layer 11 to the face with the adhesive 14, and stacking the second current collector layer 12 onto the other face of the insulating layer 13, for which the adhesive 14 is provided, via the adhesive 14, to adhere the second current collector layer 12 to the other face with the adhesive 14 (FIGS. 9D and 10D).

Whereby, the short-circuit current shunt part 10 shown in FIGS. 6A and 6B can be made. Such steps S1*a* to S1*d* can be carried out on a continuous production line. For example, belt-shaped insulating film is continuously wound out from an insulating film roll; an apparatus that continuously coats predetermined portions of both faces of the insulating film with a binder solution is installed on the downstream side of the roll (die coater or gravure coater); an apparatus that dries the binder solution with which the surfaces of the insulating film is coated is installed on the downstream side thereof; a cutter that continuously cuts the insulating film is installed on the downstream side thereof; and current collector foil and the insulating film are adhered to each other with the adhesive on the downstream side thereof. As described above, it is believed that the steps S1*a* to S1*d* makes the productivity of the short-circuit current shunt part 10 improved.

The steps S1*a* to S1*d* are not restricted to be carried out in the above order. For example, one may carry out the step S1*d* (adhesion of the current collector layers) after the step S1*b* (provision of the adhesive for the insulating layer), and thereafter the step S1*c* (cutting of the insulating layer).

3. Additional Notes

The above description showed the embodiment of configuring the short-circuit current shunt part by two first current collector layers, two insulating layers, and one second current collector layer. The all-solid-state battery of the present disclosure is not restricted to this embodiment. The short-circuit current shunt part has only to include the insulating layer between the first and second current collector layers, and the numbers of the layers are not limited. However, as shown in FIGS. 6A, 6B and 10D, the short-circuit current shunt part having five-layer structure makes it also possible to adhere the insulating layers 13, 13 to each other by the adhesive 14, which is believed to lead to improved adhesive strength of the short-circuit current shunt part.

The above description showed the embodiment that two electric elements share one anode current collector layer. The all-solid-state battery of the present disclosure is not restricted to this embodiment. Each electric element has only to function as a single cell, where the cathode current collector layer, the cathode material layer, the solid electrolyte layer, the anode material layer, and the anode current collector layer are stacked.

The above description showed the embodiment of providing the short-circuit current shunt part on each outer side of a plurality of the electric elements in terms of the direction of stacking the electric elements in the all-solid-state battery. The number of the short-circuit current shunt parts is not limited to this. Two or more short-circuit current shunt parts may be provided for the all-solid-state battery. Places where the short-circuit current shunt parts are provided are not limited to the outside a plurality of the electric elements in terms of the direction of stacking the electric elements, but may be between a plurality of the electric elements.

The above description showed the embodiment of stacking a plurality of the electric elements. Some effect is believed to be brought about even in an embodiment that a plurality of the electric elements are not stacked in the all-solid-state battery (embodiment of being formed of only a single cell). It is noted that Joule heating due to short circuits in nail penetration testing is easier to increase in the embodiment of stacking a plurality of the electric elements than in the embodiment of stacking one electric element. That is, the effect of providing a short-circuit current shunt part is more outstanding in the embodiment of stacking a plurality of the electric elements.

In the above description, the current collector tabs protrude from the short-circuit current shunt parts and the electric elements. However, in the all-solid-state battery of the present disclosure, the current collector tabs do not have to be included. For example, the current collector layers of large areas are used, the outer edges of a plurality of the current collector layers are made to protrude in the stack of the short-circuit current shunt parts and the electric elements, and conducting material is held between the protruding current collector layers, which makes it possible to electrically connect the current collector layers to each other without any tabs provided. Alternatively, the current collector layers may be electrically connected with each other via conductor wires or the like instead of the tabs.

The above description showed the embodiment of providing the adhesive between the current collector tabs and the insulating layers in each short-circuit current shunt part. The all-solid-state battery of this disclosure is not limited to this embodiment. For example, the short-circuit current shunt part having a sufficiently larger area than that of an electric element is used, which makes it possible for the whole of the outer edge of the short-circuit current shunt part to protrude to the zone where the constraint pressure is not applied (for example, outside the cathode material layers etc. in the view in the stacking direction). In this case, the current collector layers may be adhered to the insulating layers via the adhesive at any portion of the outer edge.

The above description showed a stacked "all-solid-state battery". On the other hand, a battery case of a solution based battery is generally filled with an electrolyte solution, the layers are immersed with the electrolyte solution, and this solution based battery is not necessary to be constrained by a constraining member like an all-solid-state battery. Thus, in a solution based battery, the above described problems cannot arise. The technique of this disclosure can be said to bring about outstanding effect for the first time when applied to an all-solid-state battery.

When the electric elements are electrically connected with each other in series using a bipolar electrode, it is believed that if a nail is penetrated through some electric elements, a rounding current flows via the nail from the other electric elements to some electric elements. That is, the rounding current flows via the nail, which has high contact resistance, and thus the current flow thereof is small. When the electric elements are electrically connected with each other in series via a bipolar electrode, a rounding current is believed to be the largest when a nail is penetrated through all the electric elements. In this case, it is believed that discharge of the electric elements has sufficiently progressed already, and thus, it is difficult to occur that the temperature of some electric elements locally rises. In this point, it is believed that the effect of the short-circuit current shunt part 10 is less compared with the case where the electric elements are electrically connected in parallel. Thus, the technique of this disclosure can be said to exert the effect especially outstandingly on a battery where the electric elements are electrically connected with each other in parallel.

INDUSTRIAL APPLICABILITY

For example, the all-solid-state battery according to this disclosure can be preferably used as an in-vehicle large-sized power source.

REFERENCE SIGNS LIST

10 short-circuit current shunt part
11 first current collector layer 11a first current collector tab
12 second current collector layer
12a second current collector tab
13 insulating layer
14 adhesive
20 electric elements
21 cathode current collector layer
21a cathode current collector tab
22 cathode material layer
23 solid electrolyte layer
24 anode material layer
25 anode current collector layer
25a anode current collector tab
30 constraining member
100 all-solid-state battery

What is claimed is:

1. An all-solid-state battery comprising at least one short-circuit current shunt part and at least one electric element which are stacked, to the all-solid-state battery constraint pressure being applied by a constraining member in a direction of stacking the short-circuit current shunt part and the electric element, wherein
the short-circuit current shunt part comprises a first current collector layer, a second current collector layer, and an insulating layer provided between the first and second current collector layers, all of these layers being stacked along the direction, to be adhered to each other with adhesive,
the electric element comprises a cathode current collector layer, a cathode material layer, a solid electrolyte layer, an anode material layer, and an anode current collector layer, all of these layers being stacked along the direction,
the first current collector layer is electrically connected with the cathode current collector layer,
the second current collector layer is electrically connected with the anode current collector layer, and
the adhesive is provided for a zone in the short-circuit current shunt part to which the constraint pressure from the constraining member is not applied.

2. The all-solid-state battery according to claim 1, wherein
the adhesive is provided outside the cathode material layer, the solid electrolyte layer, and the anode material layer in a view in the direction.

3. The all-solid-state battery according to claim 1, wherein
each of the first and second current collector layers includes a current collector tab, and the adhesive is provided for the current collector tab.

4. The all-solid-state battery according to claim 3, wherein
in the view in the direction,
an area of the first current collector layer excluding the current collector tab is smaller than that of the insulating layer,
an area of the second current collector layer excluding the current collector tab is smaller than that of the insulating layer, and
the adhesive is provided for a zone in the insulating layer, the zone protruding to an outside of outer edges of the first and second current collector layers.

5. The all-solid-state battery according to claim 1, wherein the adhesive has a linear shape.

6. The all-solid-state battery according to claim 1, wherein
the short-circuit current shunt part has five-layer structure of the first current collector layer, the insulating layer, the second current collector layer, the insulating layer, and the first current collector layer, all of the layers being stacked in this order.

7. The all-solid-state battery according to claim 1, wherein
said at least one short-circuit current shunt part and a plurality of the electric elements are stacked, and the electric elements are electrically connected in parallel.

8. A method for producing an all-solid-state battery, the method comprising:
a first step of stacking a first current collector layer, an insulating layer, and a second current collector layer, and adhering them to each other with adhesive, to make at least one short-circuit current shunt part;
a second step of stacking a cathode current collector layer, a cathode material layer, a solid electrolyte layer, an anode material layer, and an anode current collector layer, to make at least one electric element;
a third step of stacking the short-circuit current shunt part and the electric element along a direction of stacking the layers; and
a fourth step of constraining the short-circuit current shunt part and the electric element, which are stacked, by a constraining member, and at the same time applying constraint pressure along the direction, wherein
a position where the adhesive is provided for the short-circuit current shunt part is determined in the first step so that the adhesive is arranged in a zone to which the constraint pressure from the constraining member is not applied in the fourth step.

9. The method according to claim 8, wherein
the position of the adhesive in the short-circuit current shunt part is determined in the first step so that the adhesive is provided outside the cathode material layer, the solid electrolyte layer, and the anode material layer in a view in the direction.

10. The method according to claim 8, wherein
each of the first and second current collector layers includes a current collector tab, and
in the first step, the current collector tab is adhered to the insulating layer with the adhesive.

11. The method according to claim 10, wherein
in the view in the direction,
an area of the first current collector layer excluding the current collector tab is smaller than that of the insulating layer,
an area of the second current collector layer excluding the current collector tab is smaller than that of the insulating layer, and
in the first step, the adhesive is provided in a zone in the insulating layer, the zone protruding to an outside of outer edges of the first and second current collector layers.

12. The method according to claim 8, wherein the adhesive has a linear shape.

13. The method according to claim 8, wherein
in the first step, the first current collector layer, the insulating layer, the second current collector layer, the insulating layer, and the first current collector layer are stacked in this order.

14. The method according to claim 8, wherein
said at least one short-circuit current shunt part and a plurality of the electric elements are stacked, and electrically connected, and the electric elements are electrically connected in parallel.

15. The method according to claim 8, wherein the first step further comprises:
- linearly providing the adhesive at part of one face, and at part of another face of the insulating layer along a longitudinal direction of the insulating layer, the insulating layer being belt-shaped;
- cutting the insulating layer, for which the adhesive is provided, into a plurality of rectangles; and
- stacking the first current collector layer onto the face of the insulating layer, for which the adhesive is provided, via the adhesive, to adhere the first current collector layer to the face with the adhesive, and stacking the second current collector layer onto the other face of the insulating layer, for which the adhesive is provided, via the adhesive, to adhere the second current collector layer to the other face with the adhesive, to make the short-circuit current shunt part.

16. The all-solid-state battery according to claim 1, wherein
- the constraining member applies the constraint pressure to a center of the short-circuit current shunt part, the center being in a direction perpendicular to the direction of stacking, and
- the zone in the short-circuit current shunt part, for which the adhesive is provided, is at an outer side of the short-circuit current shunt part in the direction perpendicular to the direction of stacking.

* * * * *